Dec. 30, 1958  J. T. DESSUREAU ET AL  2,866,448
ABRASIVE WIRE SHAPE-CUTTING STONE SAW MACHINE
Filed Jan. 24, 1958  5 Sheets-Sheet 1

INVENTORS
JOSEPH T. DESSUREAU,
JOHN B. DESSUREAU,
BY
ATTORNEYS

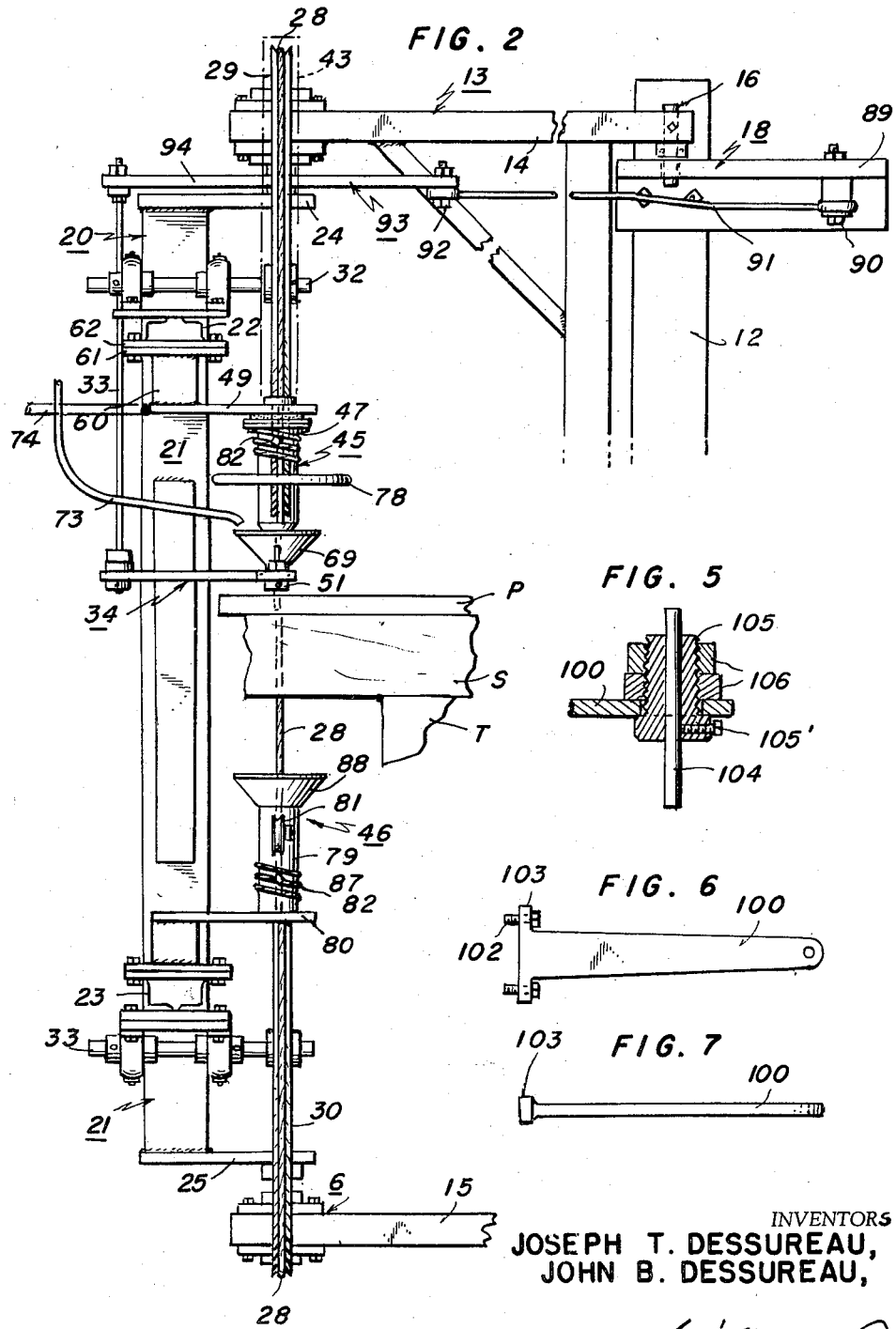

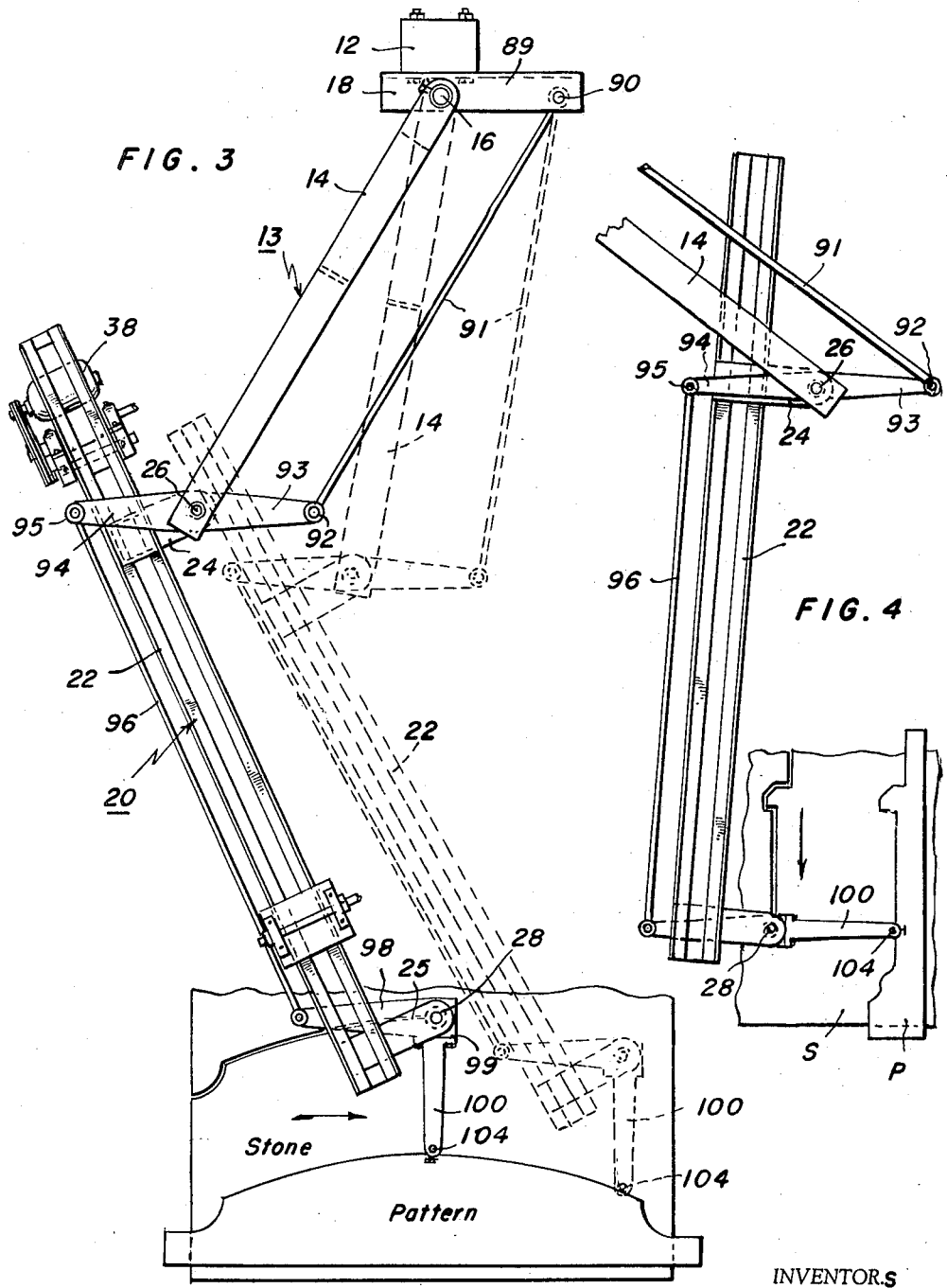

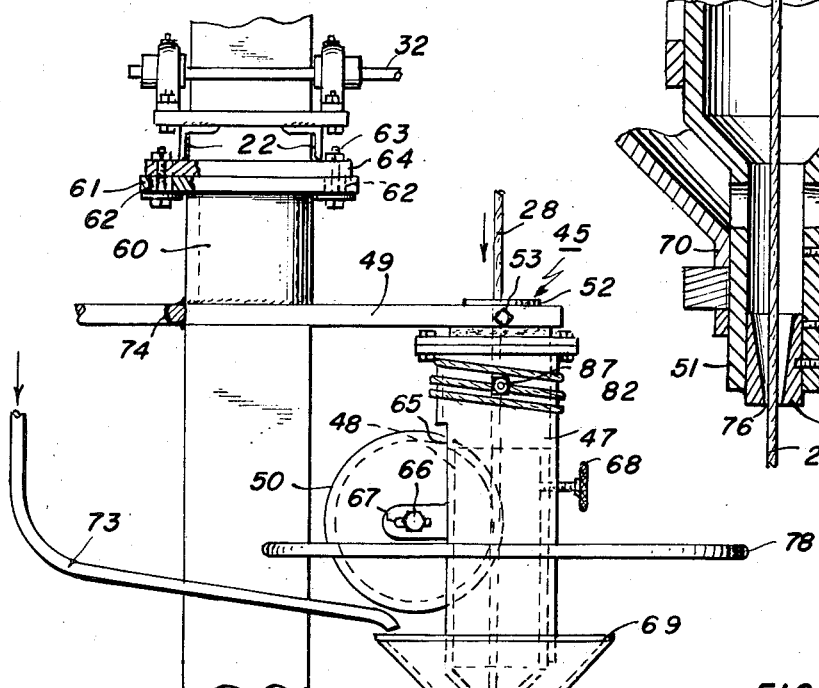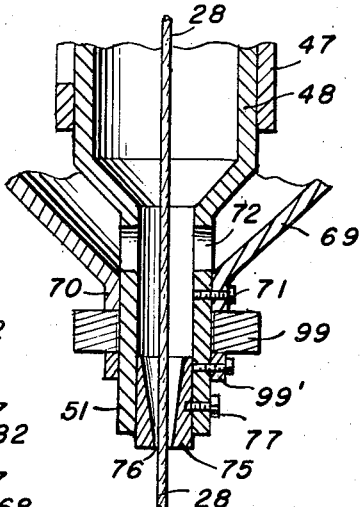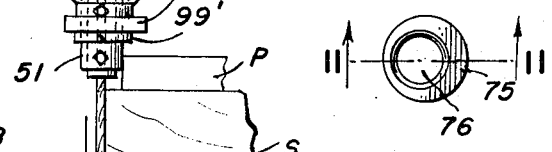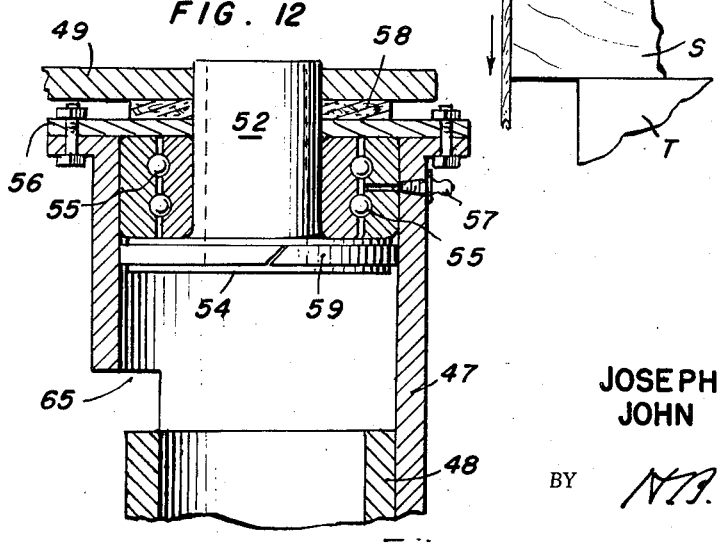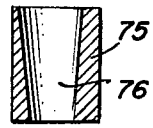

Dec. 30, 1958    J. T. DESSUREAU ET AL    2,866,448
ABRASIVE WIRE SHAPE-CUTTING STONE SAW MACHINE
Filed Jan. 24, 1958    5 Sheets-Sheet 5

INVENTORS
JOSEPH T. DESSUREAU,
JOHN B. DESSUREAU,
BY
ATTORNEYS

United States Patent Office 2,866,448
Patented Dec. 30, 1958

2,866,448

ABRASIVE WIRE SHAPE-CUTTING STONE SAW MACHINE

Joseph T. Dessureau and John B. Dessureau, Barre, Vt.

Application January 24, 1958, Serial No. 710,966

18 Claims. (Cl. 125—21)

This invention is a continuation-in-part of our application Serial No. 613,745 filed October 3, 1956 for Abrasive Wire Shape-Cutting Stone Saw Machine, now abandoned.

The invention relates to sawing machines for cutting blocks of granite, marble and other kinds of stone or other hard material, and more particularly to such machines in which the cutting is done by an endless flexible wire strand or cable with or without the feed of an abrasive material to the working run of the wire saw.

In the past such machines have been extensively used for making straight cuts through large blocks of stone or the like, the cutting run or stretch of the wire saw usually extending horizontally and being fed downwardly into a stationary block. While it has been proposed to make curved cuts with such machines by shifting the horizontal run of the wire saw laterally as it is fed downwardly and it has also been proposed to cut curved and angular shapes or profiles in the block by mounting the latter for movement relative to the horizontal run of the wire saw, such machines are not only complicated but expensive to produce and to operate.

The principal object of the invention is to provide a stone cutting machine having a vertically disposed sawing member mounted for manually shifting in all directions horizontally with respect to the block to be cut, a tracer or stylus being associated with the saw mounting to coact with a pattern which is fixed relative to the block, so that the operator by manipulating the saw mounting means to cause the tracer to move on or along the pattern, will cause the saw or cutter to sever the block according to the profile or outline of the pattern.

Another object is to provide a practical and efficient vertical saw of the above character by which smooth cuts may be rapidly and at low cost to produce tombstones, monuments, memorials, ornamental stones used in buildings, and the like.

Another object of the invention is to provide a stone sawing machine with the cutting run of a flexible wire saw disposed vertically and carried by a horizontally swinging frame or support which is manually movable so that the cutting run may be shifted in all directions horizontally with respect to a stationary block of stone, there being a guide or tracer element associated with the saw carrying frame and movable horizontally therewith so as to be moved along a pattern or template fixed relative to the stone block, when the saw carrying frame is manually actuated.

Another object is to provide a sawing machine of the above indicated character in which the cutting run of the sawing wire passes through a tubular member which may serve as the tracer or stylus that coacts with the fixed pattern.

Another object is to provide a sawing machine of this character in which a wire saw carrying frame member swings horizontally on a horizontally swinging main frame mounted on a stationary support, and in which a pantograph is combined with a movable parallelogram, whereby the tracer element or stylus is laterally offset from the vertical cutting run of the sawing wire to permit of the use of a pin-like stylus that may get into narrow slots and small contours of the pattern, thereby enabling the machine to cut fine work.

Another object is to provide a vertical saw of the character indicated in the preceding paragraph in which one leg of the pantograph may carry the stylus, or the latter may be carried by an attachment arm attachable to said leg in different angular positions with respect to the longitudinal axis of the leg, whereby the pattern may be positioned in front of or to either side of the cut made in the stone block.

Another object is to provide a stone saw in which the vertical cutting run of the sawing wire passes through an upper tubular guide which has means associated therewith for supplying an abrasive to the sawing wire.

Another object is to provide a stone saw in which the vertical cutting run of the sawing wire passes through upper and lower tubular members mounted for axial rotation and carrying guiding and thrust rollers to engage the sawing wire to eliminate vibration of its cutting run, the tubular members being simultaneously rotated in the same direction by manual means to cause the rollers to apply pressure to the wire in the direction of its horizontal shifting movement as the cut is made.

Another object is to provide a stone sawing machine with a sawing wire having a vertically disposed cutting run mounted for manual shifting horizontally in all directions and passing through a manually rotatable tubular member carrying means for supplying an abrasive to the same, there being at the lower end of the tubular member a renewable bushing with a downwardly tapered hole through which the wire moves and which causes the abrasive to be wedged into the grooves of the wire.

Another object is to provide in a stone saw having the cutting run of its sawing wire vertically disposed, a horizontally swinging saw carriage with effective means for mounting the endless wire and adjusting its tension.

With the above and other objects and advantages in view, the invention resides in the novel combinations and arrangements of parts and the novel features of construction hereinafter described and claimed, and illustrated in the accompanying drawings which show the present preferred embodiments of the invention.

In the drawings:

Fig. 2 is an elevation of the front or outer end of the wire saw carriage on a slightly enlarged scale and showing parts of the main frame and its support;

Figure 1:
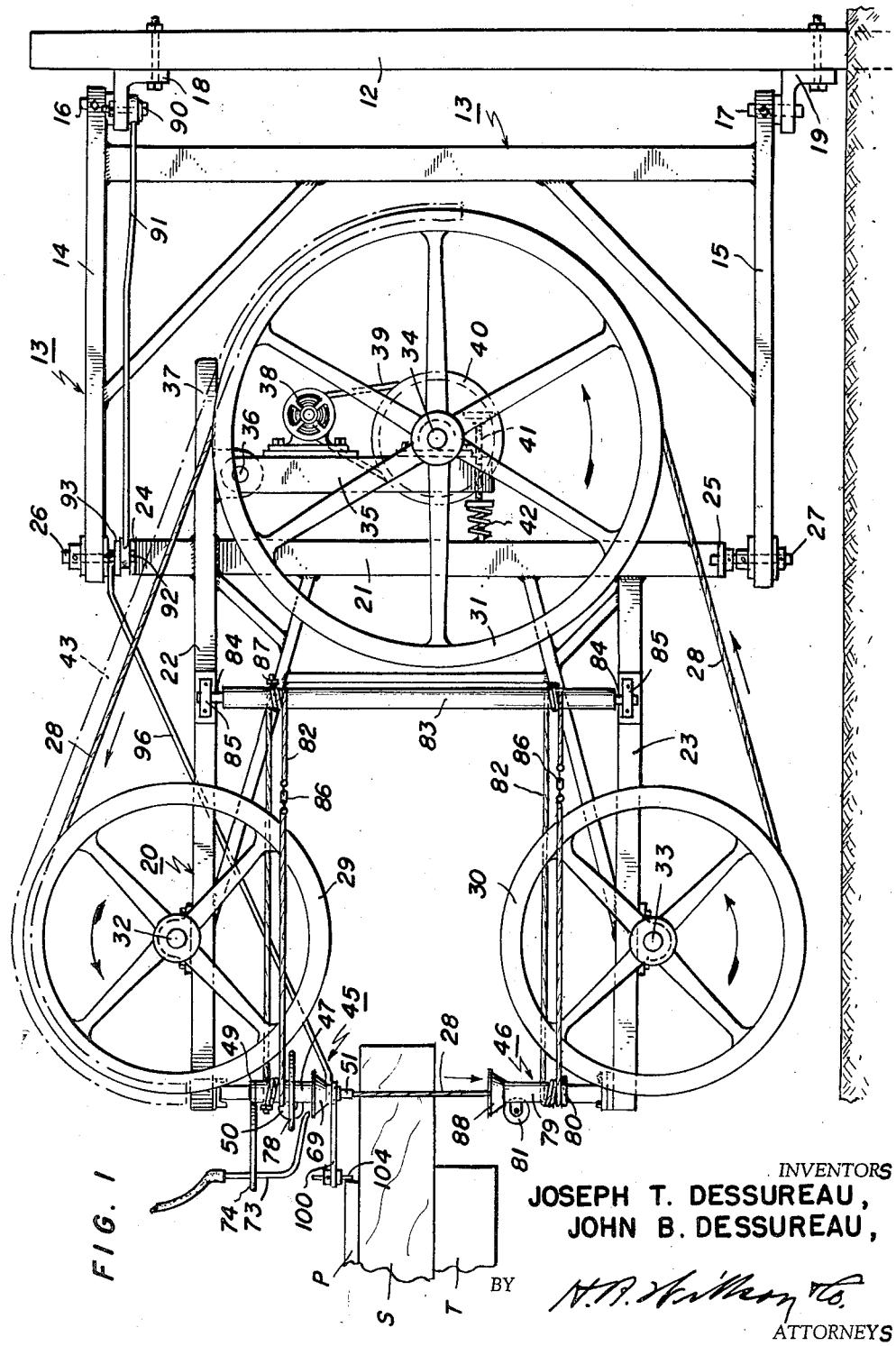
Fig. 1 is a side elevation of the present preferred embodiment of our invention.
Figure 13:
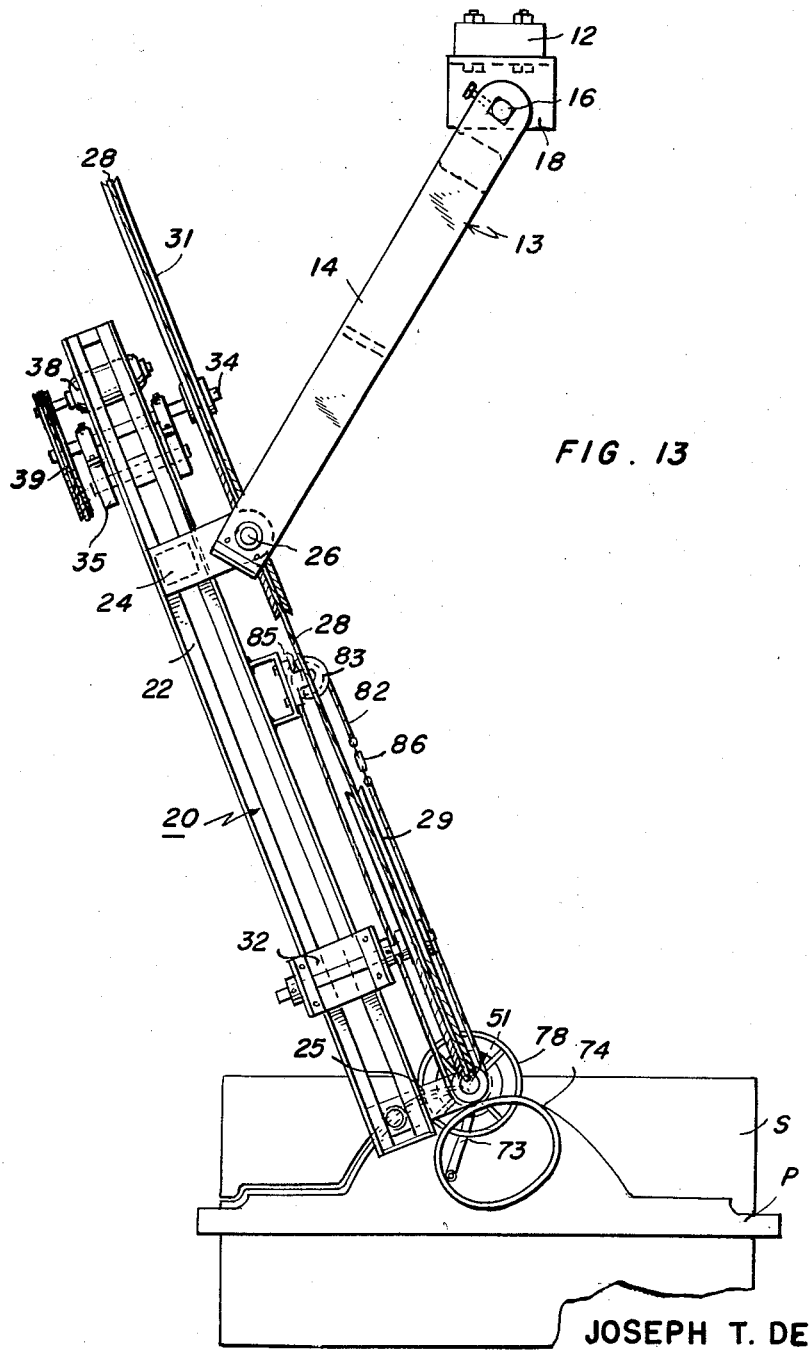

Fig. 3 is a detail top plan view of most of what is shown in Fig. 1 on an enlarged scale but with the saw frame and the main frame in different positions, the saw and other parts being omitted to more clearly show in full and dotted lines how the vertical cutting run of the wire saw will cut a stone according to a profile of a pattern disposed in front of the wire as a tracer or stylus is moved along the pattern;

Fig. 4 is a detail plan view of parts of Fig. 3 showing a pattern disposed to one side of the sawing wire, the stylus carrying arm being disposed at right angles to its position in Fig. 3;

Fig. 5 is a detail sectional view on an enlarged scale through the outer end of the stylus carrying arm showing the adjustment of the stylus pin thereon;

Figs. 6 and 7 are respectively top and side views of the stylus carrying arm;

Fig. 8 is an enlarged detail view of the upper guide assembly for the sawing wire and associated parts; and showing how a tubular portion of the assembly might be used as a stylus to be moved along the profile of a pattern;

Fig. 9 is a detail vertical section through the lower tubular portion of the upper guide assembly, the bushing thereon and a portion of the abrasive hopper or funnel;

Fig. 10 is an enlarged top view of the bushing;

Fig. 11 is a detail section taken on the line 11—11 in Fig. 10;

Fig. 12 is a detail vertical section showing the manner of rotatably mounting the body portion of the upper guide assembly; and Fig. 13 is a top plan view of another embodiment of the invention in which a tubular part of the upper guide assembly is used as a stylus.

Referring more in detail to Figs. 1, 2 and 3 of the drawings the numeral 12 denotes a post, wall or other upright support on which is mounted for horizontal swinging an upright main frame 13 preferably of U-shape. It has upper and lower arms 14 and 15 suitably connected and braced, the rear ends of the arms being mounted on vertically alined pivots 16 and 17 in suitable bearings on upper and lower brackets 18 and 19 fixed to the support 12. On the outer ends of the arms 14 and 15 is supported a second horizontally swinging frame 20 on which the saw or cutter is mounted. This frame or saw carriage comprises a vertical post 21 and a pair of vertically alined arms 22 and 23 preferably formed of angle metal bars as seen in Fig. 2. The ends of the post or upright 21 project beyond the upper and lower arms and carry laterally projecting bracket plates 24 and 25 mounted on pivot pins 26 and 27 carried in suitable bearings on the outer ends of the arms 14 and 15 in order to support the saw carrying frame 20 for horizontal swinging.

The cutter 28 is preferably an endless flexible wire saw trained around three large pulleys or sheaves 29, 30 and 31 which have grooves lined with rubber or the like. The sheaves 29 and 30 preferably have a diameter of 3½′ and are vertically alined so that the vertical portion of the sawing wire between them forms the cutting stretch or run. These sheaves are supported on transverse shafts 32 and 33 mounted in bearings on plates fixed to the outer portions of the arms 22 and 23. The diameter of the sheave 31 is preferably 5′ and it is motor driven and mounted for adjustment on the rear part of the frame 20 so that the tension of the sawing wire may be varied. As shown in Fig. 1, the sheave 31 is fixed to a shaft 34 in bearings on the lower end of a pendulum-like bar or lever 35 the upper end of which is supported on a transverse pivot 36 carried by an extended rear end 37 of the arm 22. An electric motor 38 is mounted on the rear side of the pendulum 35 and drives a belt 39 passing around a pulley 40 on the shaft 34. To adjust the tension of the sawing wire a screw 41 is threaded through the lower end of the pendulum and thrusts against a coil spring or the like 42 mounted on the post 21. The arms 22 and 23 are braced as shown from the post 21, and if desired a channel shaped guard 43 may be provided on the arm 22 for the top run of the wire saw, as indicated in dotted lines in Fig. 1.

The vertical cutting run of the wire saw passes through a tubular guide carried by the upper arm 22 and to which an abrasive material may be fed to facilitate the cutting action of the saw; and as disclosed in our above mentioned application Serial No. 631,745, such tubular guide may be used as a tracer or stylus to follow the profile of a pattern associated with the stone being cut. That will be apparent upon reference to Figs. 8 and 13 of the drawings of this application and an explanation which will follow. In such a machine the tubular guide or tracer through which the wire saw travels must have a substantial outer diameter and hence cannot get into narrow slots or small contours of the pattern. That machine is therefore not adapted to cut the fine work that can be done with the machine shown in Figs. 1, 2 and 3 in which a pin-like stylus is laterally offset about a foot from the vertical cutting run of the saw. However in both forms of the invention it is desirable to prevent the cutting run of the saw from vibrating and to apply pressure to it in the direction of the lateral travel or shifting of the sawing wire in accordance with the profile of the pattern. That is accomplished by using upper and lower guide assemblies which are axially rotatable on the arms 22 and 23, which carry saw engaging rollers or sheaves, and which are connected for simultaneous rotation in the same direction by manual means so that pressure may be applied to the saw in any direction to produce fast and smooth cutting of the stone. In Figs. 1 and 2 the numeral 45 denotes as a whole the upper saw guiding and bracing assembly and 46 the slightly different lower assembly.

The upper assembly 45, shown more clearly in Fig. 8, comprises a tubular body having outer and inner cylindrical sections 47 and 48 telescopically adjustable. The outer and upper section 47 is rotatably suspended from a bracket arm 49 adjustably mounted at the outer end of the arm 22. The lower and inner section 48 carries a saw bracing sheave 50 and has a reduced cylindrical lower end or tubular portion 51 which may be used as a tracer or stylus to be moved along the profile of a pattern or template P mounted on or in fixed relation to a stone S suitably supported on a table or stand T.

The manner of rotatably mounting the upper assembly is shown in Fig. 12 and comprises a tubular shaft section 52 fixed in an opening in the arm or plate 49 by a set screw or the like 53 and having an enlarged cylindrical lower end or head 54. The latter has a sliding fit in the bore of the outer tubular section 47. A double row of anti-friction ball bearings 55 is provided around the shaft 52 and between the head 54 and a top plate 56 fastened to the flanged upper end of the section 47 and through which the shaft 52 extends. A lubricant is supplied to the bearings through a fitting 57, and to retain the lubricant, a felt washer 58 surrounds the projecting upper portion of the shaft and a split sealing ring 59 is provided in a groove in the edge of the head 54.

The sawing wire passes through the assembly 45 and in order to center the latter on the wire or saw, the arm 49 is mounted for limited adjustment in all directions. That arm is welded to the lower end of a short pipe section 60 on the upper end of which is welded a plate 61 of larger diameter or size than the section 60. In the projecting portions of the plate 61 is a series of large holes 62. The plate 61 is fastened by bolts 63 to a plate 64 welded to the bottom of the arm 22. The bolts pass through the holes 62 and are shiftable therein to provide the adjustment.

The rubber lined sheave 50 extends through an upright slot 65 in the outer section 47 and is adjustable radially of the assembly. It rotates on a shaft 66 adjustable in slots in a pair of ears 67 welded to the upper part of the inner section 48. The latter is vertically slidable to vary the position of the tubular guide element 51 relative to the pattern and it may be fixed in an adjusted position by a set screw 68 or equivalent means.

In order to supply an abrasive to the sawing wire a funnel-shaped hopper 69 is preferably mounted on the reduced tubular element 51. The funnel has at its lower end a collar 70 slidable on the element 51 and fastened to a set screw 71 below a series of holes 72 formed in the element. The abrasive, preferably a mixture of water and an abrasive material, is fed to the funnel through a flexible hose attached to a rigid supply pipe 73 preferably supported from a handle 74 projecting forwardly from a non-rotatable portion of the assembly. As seen in Fig. 1, the handle may be a ring or loop welded on the arm 49.

When the sawing wire is of the diamond impregnated type it is not necessary to use an abrasive material, but usually the cutter is composed of twisted wire strands and it is then important that the mixture be properly fed since the cutter is operating in a vertical position. We have found it important to use in the tubular guide element 51 a renewable bushing 75 with a downwardly tapered hole 76 so that there is a wedging effect of the cutting mixture into the grooves of the sawing wire. In making the bushing the downwardly tapered hole is preferably eccentrically positioned, as seen in Figs. 10 and 11, so that when the cutting pressure is applied against the stone, the sawing wire will be centered through the tapered hole. The bushing may be adjustably and removably fixed in the tube or element 51 by a set screw 77.

In order to rotate the assembly 45 so that the wire guiding and bracing sheave will apply pressure in the direction in which the cut is being made, a circular or annular handle 78 surrounds and is suitably fixed to the outer section 47 of the body of the assembly. This handle may be a ring with a series of spokes spacing it from the section, as will be understood upon reference to Fig. 13.

The lower assembly 46 extends upwardly from the lower arm 23 and it does not have the handles and the abrasive feeding means of the upper one. It has a cylindrical body 79 rotatably mounted on a bracket arm or plate 80 which corresponds to the arm 49 and which may be adjustably mounted on the top of the arm 23 in the same manner as the adjustment of the arm 49. This lower assembly has an adjustably mounted saw guiding and bracing sheave 81, the same as the sheave 50, but mounted directly on the tubular body 79 and positioned in a slot in the same. The tubular bodies 47 and 79 of the two assemblies have the same diameters and in order to rotate them in unison they are used as drums for upper and lower endless cables 82 wound several times around them and also around an upright drum 83 having the ends of its shaft 84 mounted in bearings 85 on the arms 22 and 23, as seen in Fig. 1. Each of these wire rope cables includes a turnbuckle 86 ot take up slack and to prevent slippage of the cables on the drums after they have been tightened, a cable clamp 87 may be provided on each drum. It will be seen that when the hand wheel 78 of the upper assembly is turned, the upper cable will transmit the motion of the body 47 to the drum 83 and the lower cable will transmit the motion of the drum 83 to the body 79 of the lower assembly. In order to prevent the abrasive mixture moving down the sawing wire from getting on the lower cable and adjacent parts, the lower assembly has a funnel shaped flange 88 mounted on the top of the body 79.

In order for the machine to cut fine work the tracer or stylus must be a small pin laterally offset from the cutting run of the wire saw and the run must be shifted or moved in various directions horizontally in unison with the movement of the stylus along or on the pattern. That is accomplished by the arrangement of links and levers shown more clearly in Fig. 3 and forming a pantograph combined with a movable parallelogram. In this preferred form of the machine the upper angle bracket 18 on the support 12 is extended horizontally beyond the pivot 16 of the upper arm 14 of the main frame 13, as at 89, and carries a pivot 90 for a link 91 extending parallel with the arm 14 and of the same length as that arm. The forward end of this link is pivoted at 92 to one arm 93 of a two arm lever rotatable on the pivot 26 which connects the arm 14 to the arm 22 through the bracket plate 24. It will be seen that the parts 14, 89, 91 and 93 form a movable parallelogram. The other arm 94 of the two arm lever has pivoted to it at 95 the upper end of a link 96 which extends downwardly and forwardly in a plane parallel with the vertical plane of the arm 22. The lower and forward end of the link 96 is pivoted at 97 to a lever arm 98 that is rotatably mounted on the rotatable portion of the upper guide assembly 45 through which the sawing wire extends. That rotatable mounting may be effected by providing on the tubular element 51 a rotatable collar 99, as shown in Fig. 8, and connecting the lever 98 to it either detachably or by making these parts in one piece as shown in Fig. 3. While the stylus pin might be carried by the pivotal connection between the link 96 and lever 98, it is preferably carried by a separate arm or lever 100 which may be attached to the hub portion of the lever or collar 99 in different radially extending positions so that the stylus may be in front of or to the side of the sawing wire as will be seen upon reference to Figs. 3 and 4. The hub or collar 99 is rotatably retained on the tubular element 51 beneath the funnel by a retaining ring or collar 99' fastened by a set screw as seen in Fig. 8. This hub of the lever arm 98 has flat outer faces 101 at right angles to each other and the stylus carrying arm 100 may be detachably fastened to any of those faces by screws or bolts 102 passing through holes in the enlarged end 103 of the arm 100. The stylus 104 is a straight metal pin adjustably mounted on the outer end of the arm as shown in Fig. 5. The pin is slidable in a central bore in a screw 105 threaded through the arm 100 and secured by nuts 106. A set screw 105' fixes the stylus in position after it has been adjusted with respect to the pattern. Fig. 3 shows the stylus arm 100 at right angles to the lever 98 with the pattern in front of the cut made in the stone, while Fig. 4 shows the arm in alinement with the lever and the pattern to one side of the cut. It will be seen that the lever 94 and the lever 98 with its arm 100 form two short legs of pantograph, the long legs of which are formed by the link 96 and the arm 22 with its bracket plates 24 and 25. Since the leg 93 of the parallelogram moves with the leg 94 of the pantograph and the stylus is carried by a part of the pantograph leg 98, the upper guide assembly 45 will cause the sawing wire to be shifted horizontally in various directions according to the movement of the stylus 104 along the profile of the pattern.

The machine shown in Fig. 13 is the same as the preferred form shown in Figs. 1, 2 and 3 except that it does not have the linkage needed when the stylus is laterally offset from the cutting run of the saw, and hence the corresponding parts of both machines have the same reference numerals.

The flexible sawing wire after being threaded through the guide assemblies has its ends suitably joined to form an endless cutter; and where the stone or workpiece is to have a cut-out portion disposed entirely within the periphery of the stone, the wire is passed through a hole bored in the stone before its ends are joined.

The operation of the machine will be apparent from the foregoing detailed description of the construction and operation of its parts, but it is to be noted that by mounting the saw for universal movement horizontally and using the vertical motion of the saw for cutting in connection with a guide or stylus to move along a pattern in fixed relation to the stationary stone or workpiece, it is possible to cut almost any design with speed and at low cost. The use of the machine requires no expensive stone set up. It is easy to operate and no experienced help is required. The machine will cut stones up to 18" in thickness and since the cuts are smooth very little if any finishing is required. The machine may be used to cut serpentines, checks, ovals, nosings, holes, circular strips, entrances, windows, etc.

It will be obvious that some of the novel features of the machine may be used in connection with a stone sawing machine which has its cutting run extending in a horizontal direction. For example the tubular members 47 and 79 with their pressure applying rollers 50 and 81 and the means 82—83 for rotating them in unison may be used on a saw having a horizontal cutting run since the pressure applying rollers or sheaves will tend to prevent the cutting run from leaving the sheaves about which the sawing wire is trained, when lateral pressure is applied to the wire to make a slightly curved cut.

From the foregoing, taken in connection with the ac-

We claim:

1. In a shape-cutting abrasive wire saw machine for cutting a stationary workpiece to the profile of a pattern fixed relative to the latter, a sawing wire, a plurality of sheaves over which said sawing wire is trained for movement in a closed path with a substantially vertical run, means for driving one of said sheaves to impart motion to said sawing wire, a manually movable support upon which said sheaves and driving means are carried, means mounting said support for horizontal movement in all directions, and tracer means having an element movable horizontally with said support, said element of the tracer means being movable along the edge of a pattern by the manual manipulation of said support to cause the vertical run of said sawing wire to cut a workpiece to the profile of the pattern.

2. The machine of claim 1 in which said element of the tracer means is a tubular member through which the vertical run of said sawing wire moves.

3. The machine of claim 1 in which said element of the tracer means is a stylus pin laterally offset from the vertical run of said sawing wire and is connected through link and lever means with said support and its mounting means to cause the stylus pin and the vertical run of the sawing wire to move in unison in all horizontal directions.

4. The machine of claim 3 in which said link and lever means comprises a pantograph combined with a movable parallelogram.

5. The machine of claim 1 together with means for feeding an abrasive to the vertical run of the sawing wire.

6. The machine of claim 1 together with a tubular member carried by said support and through which the vertical run of the sawing wire moves, and means for feeding an abrasive to said tubular member, the latter having means causing the abrasive to be wedged against the sawing wire.

7. The machine of claim 6 in which said last mentioned means is a downwardly tapered hole in a renewable bushing fastened in said tubular member.

8. The machine of claim 6 in which said tubular member is mounted for axial rotation and is manually rotatable, and a roller on said tubular member and engaging the sawing wire passing therethrough, said tubular member being manually rotatable to cause said roller to apply pressure to the sawing wire in the direction of the cut being made by the latter.

9. The machine of claim 1 in which said support includes upper and lower arms between which the vertical run of the sawing wire extends, together with upper and lower tubular guide members axially rotatable on said arms and through which the vertical run of the sawing wire extends, a roller on each of said tubular members engaging the sawing wire therein, handle means on said upper tubular member for manually rotating it, and means on said support for imparting the rotary movement of the upper member to the lower member to cause them to move in the same direction in unison, whereby their rollers will apply pressure to the sawing wire in the direction of the cut being made by the latter.

10. The machine of claim 9 in which said last mentioned means comprises a cylindrical drum portion on each of said members, the drum portions having the same diameter, rotatable drum means on said support and upper and lower endless cables each having a portion wound around said drum means and a portion wound around a drum portion of one of said members.

11. The machine of claim 9 together with means for feeding an abrasive to the sawing wire as it passes through the upper tubular member.

12. The machine of claim 1 in which said support includes an upright frame having upper and lower forwardly projecting arms, means rotatably mounting two of said plurality of sheaves on the forward portions of said arms, said plurality also including a third and larger sheave which is said one that is driven, said third or driven sheave being disposed at the rear portion of said frame, a forwardly and rearwardly swinging pendulum mounted at the rear portion of said frame, said third or driven sheave being mounted on said pendulum, and adjustable spring means urging said pendulum rearwardly to apply tension to the sawing wire trained around said plurality of sheaves, said means for driving said driven sheave being also mounted on said pendulum.

13. In a machine for cutting stone or the like, a driven endless sawing wire having a vertically disposed cutting run, means mounting said sawing wire to permit its vertical run to be shifted in all directions horizontally, said mounting means carrying upper and lower tubular members through which the vertical run moves downwardly, means mounting said tubular members for axial rotation, a sheave mounted on each of said members and engaged with the sawing wire therein, said sheaves being vertically alined, handle means carried by said upper member for manually rotating it, and means carried by said mounting means and associated with said members for rotating said lower member in unison with said upper member to cause said sheaves to apply pressure to the vertical run of the sawing wire in the direction of the cut made by the latter.

14. The combination of claim 13 together with means for feeding an abrasive to said upper tubular member, and a bushing in the lower end of said upper tubular member, said bushing having a downwardly tapered hole through which the sawing wire moves downwardly, said hole being eccentrically positioned in said bushing.

15. In a machine for cutting stone or the like, a driven endless sawing wire having a vertically disposed cutting run, a stationary support, means mounting said sawing wire to permit its vertical run to be moved horizontally in all directions, said means including a main frame having a horizontal arm, a pivot vertically connecting said arm to said support, a saw carrying frame having a horizontal arm, a vertical pivot connecting the last mentioned arm to the main frame arm and a tubular member rotatable on said arm of the saw carrying frame and through which the vertical run of the sawing wire moves, a double-arm lever swingable on said pivot connecting the two first mentioned arms, a link parallel with and of equal length with said arm of the main frame and having one end pivoted to said support and its other end pivoted to one arm of said double-arm lever, a lever arm fixed to said tubular member, a second link parallel with and of substantially equal length with said arm of the saw carrying frame, and having one end pivoted to the second arm of said double-arm lever and its other end pivoted to said arm on the tubular member, a stylus movable along the profile of a pattern fixed relative to the stone to be sawed, and a second arm fixed to said tubular member and carrying said stylus.

16. The machine of claim 15 together with means for fixing said stylus carrying arm to said tubular member in different angular positions with respect to the longitudinal axis of the other arm on said tubular member.

17. In a machine for cutting stone or the like, a driven endless sawing wire having a cutting run extending between two sheaves carried by a movable support, longitudinally spaced and axially alined tubular members rotatably carried by said support and through which the cutting run of the sawing wire travels, a roller carried by each of said members and engaging the cutting run of the sawing wire to apply pressure thereto, and manually actuated means for rotating said members in unison.

18. In a machine for cutting stone or the like, a driven endless sawing wire with means for mounting and driving it to provide a cutting run that is disposed vertically and travels downwardly, said means permitting the cutting run to be shifted horizontally in all directions and including a tubular element through which the cutting run moves, and means for supplying an abrasive material to said tubular element at the upper portion of the cutting run.

References Cited in the file of this patent

UNITED STATES PATENTS

| | | |
|---|---|---|
| 2,369,068 | Mentzer | Feb. 6, 1945 |
| 2,511,989 | Nardi | June 20, 1950 |
| 2,803,239 | D'Avaucourt | Aug. 20, 1957 |

FOREIGN PATENTS

| | | |
|---|---|---|
| 710,494 | France | June 8, 1931 |